UNITED STATES PATENT OFFICE.

SAMUEL V. HARBAUGH, OF BALTIMORE, MARYLAND, ASSIGNOR TO ANNIE E. CRADDICK AND ELLEN E. GARRETTSON, BOTH OF SAME PLACE.

CLEANSING COMPOUND.

SPECIFICATION forming part of Letters Patent No. 430,850, dated June 24, 1890.

Application filed March 1, 1890. Serial No. 342,269. (Specimens.)

*To all whom it may concern:*

Be it known that I, SAMUEL V. HARBAUGH, a citizen of the United States, residing at Baltimore, in the State of Maryland, have invented certain new and useful Improvements in Composition of Cleansing Compounds; and I do declare the following to be a full, clear, and exact description of the invention, such as will enable others skilled in the art to which it appertains to make and use the same.

I have for my invention the composition of a cleansing compound which is particularly adapted to cleaning polished metallic surfaces, and to imparting a bright luster thereto, the special ingredients that are incorporated in the composition, and the process of manufacture employed to properly unite the said ingredients, producing an impalpable cleansing-powder which, when moistened by water and applied as a paste to metallic surfaces, acts as a solvent for any foreign deposit thereon, and by slight friction will remove such foreign deposit and impart a bright luster to the said metallic surface, the manner of preparing the composition permitting it to be made in either a powder, paste, or cake form for convenience of handling or transportation.

I now proceed to describe the process of manufacture and the ingredients used, whereby the said results are obtained.

The quantities of material herein specified are found in practice to give the best results, though the relative quantities may be slightly varied without producing material change. There is first selected about two hundred pounds of ashes of hard white-ash coal, care being taken that the best quality of this coal, free from impurities, be consumed in order to produce a proper ash for the purpose. This ash is passed through sieves of different meshes, the last of which is so fine that only an impalpable powder can be passed therethrough. This ash-powder is now placed in a suitable vessel wherein it may be heated, and whereby all moisture will be driven therefrom. While the ash-powder is being subjected to this heating and drying process there is prepared a solution which consists of three gallons of boiling-hot water, in which is thoroughly mixed one-half pound of chloride of lime, (bleaching-powder,) to which is added two pounds of salts of tartar, (carbonate of potash,) thoroughly incorporated therewith. This mixture is now allowed to cool, and there is then added thereto an additional seven gallons of pure water, after which, when thoroughly cooled, is mixed therewith one-half pound of carbonate of ammonia. When the thoroughly sifted and desiccated ash-powder has cooled to the desired temperature of about 105° Fahrenheit, it is removed from the heating-vessel and placed in a mixing-trough, and therein has poured gradually thereover the solution just described, care being taken that the composition is thoroughly stirred during the process of pouring the solution, which, when all the solution is mixed therewith, will be of a pasty consistence, after which the composition is allowed to cool thoroughly, when, if desired, it may be used in this paste form for cleaning purposes.

If it should be desired to use the cleansing composition in the form of a powder, the pasty composition is placed in suitable pans and exposed to a dry air, whereby the moisture will be driven therefrom without evaporating the ammonia therein. When thoroughly dried, the composition may then be readily reduced by any of the known ways to an impalpable powder. In this process of drying the composition to reduce it to a powder there will be liberated a quantity of chlorine from the chloride of lime, and some quantity of ammonia will be set free from the carbonate of ammonia. To compensate for these losses, there is added to the composition after it is reduced to the powdered form small additional quantities of chloride of lime and of carbonate of ammonia, which, having been pulverized, may be safely and easily mixed therewith, and thus maintain the proper proportion of parts in the composition.

If it should be desired to place the composition on the market in the form of cakes or bars, which for transportation and convenience of handling is the most desired form, there is mixed with the pasty composition about fifty pounds of potter's clay, after which it is placed in suitable molds and compressed therein to the desired cake or bar form, the potter's clay adding such adhesiveness to the composition that when the cakes or bars become dried they will be sufficiently hard to maintain their form.

In incorporating in the composition the salts of tartar, chloride of lime, and carbonate of ammonia there are employed the best-known solvents for purposes of cleansing, and the particular process of manufacture herein described so unites these ingredients with the specially-prepared and impalpable ash-powder, which in itself has cleansing properties, that a composition is produced which will remove all ordinary foreign matter that may adhere to or form on metallic surfaces, and impart to the said surface a bright and lasting luster.

Having described my invention and the manner of preparing the same, what I claim, and desire to secure by United States Letters Patent, is—

In a cleaning compound, the combination of coal-ashes which have been sifted and desiccated, with a due proportion of water, salts of tartar, chloride of lime, and carbonate of ammonia, for the purpose set forth.

In testimony whereof I affix my signature in presence of two witnesses.

SAMUEL V. HARBAUGH.

Witnesses:
JNO. T. MADDOX,
HENRY LINGENFELDER.